United States Patent [19]

Krämling et al.

[11] Patent Number: 5,198,304
[45] Date of Patent: Mar. 30, 1993

[54] VERTICALLY ADJUSTABLE SIDE GLAZING FOR MOTOR VEHICLES

[75] Inventors: Franz Krämling; Friedrich-Wilhelm Berndsen, both of Aachen, Fed. Rep. of Germany

[73] Assignee: Saint-Gobain Vitrage International, Courbevoie, France

[21] Appl. No.: 750,540

[22] Filed: Aug. 27, 1991

[30] Foreign Application Priority Data

Aug. 27, 1990 [DE] Fed. Rep. of Germany ....... 4027035

[51] Int. Cl.$^5$ .............................................. B32B 9/06
[52] U.S. Cl. ..................................... 428/437; 428/426; 428/425.6; 428/30; 428/454; 296/83; 296/84.1
[58] Field of Search ...................... 428/437, 426, 425.6, 428/454; 295/83; 296/84.1, 83

[56] References Cited

U.S. PATENT DOCUMENTS 3,558,415 1/1969 Rieser .................................. 428/437
3,592,726 11/1969 Blizard ............................... 428/437

FOREIGN PATENT DOCUMENTS 1359170 7/1974 United Kingdom ................ 428/437

Primary Examiner—Patrick J. Ryan
Assistant Examiner—Abraham Bahta
Attorney, Agent, or Firm—Oblon, Spivak, McClelland, Maier & Neustadt

[57] ABSTRACT

A vertically adjustable composite motor vehicle side glazing, particularly a door window glazing, is made from composite glass including two 1.5 to 3.5 mm thick thermally tempered individual glazings with a thermoplastic intermediate layer. Each individual glazing has in the marginal area tensile stresses in the core, which in the case of a glazing thickness of 2 mm amount to 54 to 76 MN/m$^2$ and for a glazing thickness of 3 mm amount to 46.7 to 71.2 MN/m$^2$. In the central zone within the marginal area the individual glazings have tensile stresses in the core, which in the case of a glazing thickness of 2 mm amount to 38 to 67 MN/m$^2$, while for a glazing thickness of 3 mm amount to 33 to 60 MN/m$^2$. Such composite glazings have high strength in the marginal area and a low strength in the central zone. Therefore they have excellent characteristics both from the static standpoint and from that of accident safety.

6 Claims, 1 Drawing Sheet

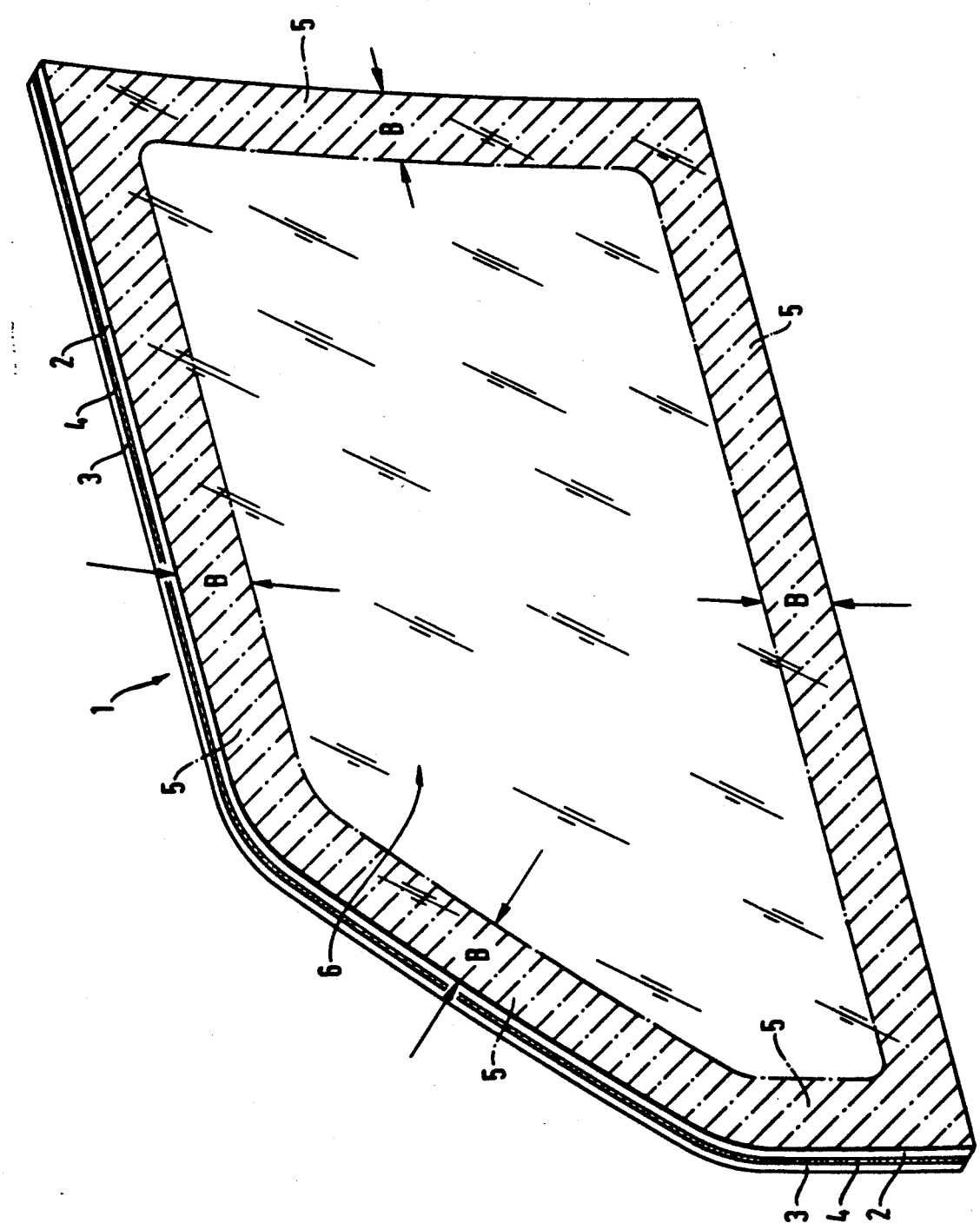

VERTICALLY ADJUSTABLE SIDE GLAZING FOR MOTOR VEHICLES

BACKGROUND OF THE INVENTION

1. Field of the Invention

The invention relates to a car glazing, particularly a vertically adjustable side glazing, formed from composite glass comprising two thermally tempered individual glazings interconnected by a thermoplastic intermediate layer.

2. Discussion of the Background

A lowerable car glazing of composite type is known from German Utility Model 89 10 916. In this type of side glazing the outer individual glazing of the composite has a thickness of 3 to 4 mm and has the standard tempering typical of a safety glazing which is formed from a single glazing. The inner individual glazing of the composite has a thickness of 1.5 to 2.5 mm and has no tempering or only a very slight tempering. The inner individual glazing also has smaller dimensions than the outer, tempered glazing and the projecting marginal area of the tampered, outer glazing is used for guiding the composite glazing in the guide rails of the window frame. The two individual glazings are interconnected with the aid of a 0.38 to 2.0 mm thick thermoplastic film.

This known glazing must, as a result of its construction, greatly inhibit break-in and penetration through the structure, whilst also having a high sound insulation property. The break-in and penetration-inhibiting action is based on the relatively thick thermoplastic intermediate layer and the fact that the non-tempered or only slightly tempered inner individual glazing is not destroyed even when the outer, tempered glazing is destroyed because the thick intermediate layer protects it. In the case where both glazings are destroyed the composite breaks into very large fragments, so that the window opening remains closed. Therefore when breaking through the side glazing is desired, namely in the case of an accident, the high strength of prior art side glazings prevent rapid break-through and rapid access to the vehicle occupants.

The present invention provides a side glazing made from composite glass which, unlike the aforementioned car side glazing, offers superior safety in case of an accident, has a simple construction and can be manufactured with known production equipment.

SUMMARY OF THE INVENTION

An object of the invention is to provide a novel composite glazing characterized in that each of the two individual glazings has a thickness of 1.5 to 3.5 mm, preferably of 2.0 to 3.0 mm, and which has a tempering that differs over the glazing surface when compared with the tempering of a single safety glass, so that all-around the marginal area the average tensile stress in the core is 5 to 15% lower than the tensile strength necessary for standardized breaking behavior given the particular glazing thickness. Also, in the area of the viewing surface, the average tensile stress in the core is 20 to 40% lower than the tensile stress necessary for standardized breaking behavior given the particular glazing thickness.

BRIEF DESCRIPTION OF THE DRAWINGS

The FIGURE shows a composite glazing in a perspective view.

DETAILED DESCRIPTION OF THE PREFERRED EMBODIMENTS

Single glazing safety glass normally has tempering which meets the requirements of the relevant standards with respect to the number and size of glass crumbs created during destruction of the glazing. In the case of car side glazings this means that for glazings which are 2 to 3 mm thick the number of crumbs within a 5 cm $\times$ 5 cm square is no smaller than 40 and no larger than 400. From the literature it is known that 40 crumbs in a 2 mm thick glazing means an average tensile stress in the core of 64 MN/m$^2$ and for a 3 mm thick glazing an average tensile stress in the core of 55 MN/m$^2$. Where the number of crumbs is 400 in a 2 mm thick glazing the average tensile stress in the core is 80 MN/m$^2$ and for a 3 mm thick glazing the average tensile stress in the core is 75 MN/m$^2$ (Kazuyuki Akeyoshi et al "Study on the Physical Tempering of Glass Plates", Reports of the Research Laboratory of Asahi Glass Company 17, No. 1, 1967). Thus in the case of 2 mm thick glazings, the standardized breaking or shattering behavior is defined as the tempering range 64 to 80 MN/m$^2$.

Therefore, according to the present invention a 2 mm thick single glazing of the composite glazing has tensile stresses in the marginal area between 54 MN/m$^2$ and 76 MN/m$^2$. Preferably the tensile stresses in the marginal area are below the lower stress value of the standardized tempering, i.e. in the range 54 to 64 MN/m$^2$. In the central zone the tensile stresses in the glazing core for a 2 mm thick single glazing are between 38 and 64 MN/m$^2$ and are preferably in the range 38 to 60 MN/m$^2$.

For 2.5 mm thick single glazings the tensile stress range for standardized breaking behavior is between 59.5 and 77.5 MN/m$^2$. Thus, in the present glazings the tensile stresses in the marginal area are between 50.6 and 73.6 MN/m$^2$ and preferably in the range 50.6 to 59.5 MN/m$^2$. In the central zone the tensile stresses of the inventive glazing are between 35.7 and 62 MN/m$^2$ and preferably in the range 35.7 to 55 MN/m$^2$.

In the case of 3 mm thick single glazings the tensile stresses in the glazing core are in the range 55 to 75 MN/m$^2$ for standardized breaking behavior. This means that single glazings of 3 mm thickness the present composite glazing have tensile stresses in the core between 46.7 and 71.2 MN/m$^2$ in the marginal area and preferably between 46.7 and 55 MN/m$^2$. In the central zone the tensile stresses in the core are 33 to 60 MN/m$^2$ and preferably 33 to 55 MN/m$^2$.

The best results are obtained if the stresses in the central glazing zone are well below the lower tempering range limit for the standardized breaking behavior, whereas in the marginal area they are only slightly below the lower tempering range limit for standardized breaking behavior. For example, in the case of a composite glazing formed from 2.5 mm thick single glazings, very good results are obtained if the tensile stresses in the marginal area are 54 to 58 MN/m$^2$ and in the central zone 46 to 50 MN/m$^2$.

A result of the differential reduction of tensile stresses in the core and the corresponding compressive stresses on the surfaces of the glazings, is to ensure that the strength in the central zone of the composite glazing is reduced compared with a composite glazing having at least one fully tempered mingle glazing to such an extent that, in case of an accident, the composite glazing can be destroyed from the outside. Consequently the window opening can be freed relatively rapidly. When the central zone of both single glazings of the present composite glazing shatter into very large fragments, the marginal area shatters into relatively small fragments which facilitates the detachment of the composite glazing from its frame.

A result of lower strength in the central zone is a reduction of injury risk in case of impact, such as impact of an occupant's head with the inner surface of the composite glazing, because the glazing tends to break and dissipate the impact energy by plastic deformation of the intermediate layer. However, higher tempering in the marginal area of the glazing significantly increases the strength of the marginal area. Due to increased strength in the marginal area the composite glazing can easily withstand the higher stresses to which it is exposed at the edges, such as when the car door is slammed shut or due to other forces acting on the border.

The differentiated tempering in the marginal area and in the viewing zone in connection with the tensile stress values of the present invention has proved advantageous in that by remaining within the indicated limits no deformations occur during the tempering process. For example, if the tensile stresses in the central zone are reduced to a greater extent, or if in the marginal area a tensile stress corresponding to the full tempering is produced, then deformations occur, which vary as a function of the shape and size, because stresses in the marginal area simultaneously bringing about a shrinkage tension. Such deformations are particularly detrimental to further processing of two single glazings to form a composite glazing.

The present invention is characterized as behaving in a similar manner to a composite glass windscreen, but at the edge or border it behaves in the manner of a side glazing made from mingle glazing safety glass. Therefore it combines the advantages of both glazing types in the manner specifically required for side glazings.

Composite glazings formed from two 2.5 mm thick single glazings are particularly advantageous. As opposed to 2 mm thick glazings, 2.5 mm thick glazings can be much more easily tempered to the desired values. Their mechanical strength is much lower than the mechanical strength of 3 mm thick glazings, so that from the biomechanical safety standpoint they are much more advantageous than 3 mm thick glazings. The width of the more strongly tempered marginal area is 0.5 to 3 cm and is preferably approximately 1 to 2 cm.

For the thermoplastic intermediate layer it has proved advantageous to use conventional polyvinyl butyral films with a thickness of e.g. 0.76 mm and corresponding thermoplastic polyurethane films which are commercially available. However it can also be appropriate to use commercially available 0.38 mm thick films. The glazings and/or thermoplastic intermediate layer can be wholly or zonally coloured in the mass or provided with colouring and/or partly reflecting, transparent surface layers.

Thermal tempering of the glazing can take place by known processes using appropriate blowing boxes. It is possible to use so-called slotted blowing boxes, which produce a substantially homogeneous stress on moving transversely with respect to the blowing slots, or it is possible to use tubular blowing boxes, which lead to stress structures corresponding to the nozzle geometry. However, it is necessary to ensure a greater heat dissipation in the marginal area of the single glazings in order to achieve the desired higher tensile stresses in the margin area.

The tensile stresses in the core of the glazings can be determined with the aid of the laser scattering light method, such as described by S. Bateson, I. W. Hunt, D. A. Dally and N. K. Sinha in the publication "Stress measurements in tempered glass plates by scattered light method with a laser source", Bulletin of the American Ceramic Society, 45, 1966, pp 193 to 198.

In practice, it is possible to roughly determine the stresses in the glazings because the fragment size of a broken glazing is easily determined, and from the known relationship between the stress value and the fragment size, conclusions can be drawn concerning the tensile stresses. The conditions regarding tensile stress values are substantially fulfilled if, on destroying the glazing in the marginal area, a breakage pattern is obtained which has slightly larger glass crumbs than conventional single glazing safety glazings, whereas the conditions regarding stress values in the central zone of the glazings are fulfilled if a very coarse-crumb breakage pattern is obtained whose fragments are well outside the fragment size range allowed by the standard for single glazing safety glass.

The inventive stress structure can be produced using known tempering means, in that conventional process parameters such as air pressure, distance from the blowing nozzles to the glazing, and the geometrical design of the blowing boxes are varied in accordance with the breakage pattern obtained until the desired breakage structure is achieved. Appropriate measures must be taken to ensure that heat dissipation in the marginal area of the glazings is greater than in the vicinity of the glazing surface. In the case of a single glazing produced on the basis of the thus determined process parameters, the stress in the central zone and in the marginal area can be measured with the aid of the laser scattered light method and the final fine adjustment of the process parameters can be carried out.

The drawing shows a composite glazing 1 with the inventive features in a perspective view. The composite glazing 1 has a slightly cylindrically curved shape and is used as a raisable and lowerable door window glazing. It comprises the inner single glazing 2 and the outer single glazing 3 which are interconnected by the application of heat and pressure with the aid of the 0.76 mm thick intermediate polyvinyl butyral layer 4. The two single glazings 2 and 3 in each case have a thickness of 2.5 mm and have the inventive stress structure. This means that within the all-around marginal area 5 with a width B of approximately 1.5 cm, the average tensile stresses in the core are 56 MN/m$^2$ and in the central zone 6 within the marginal area 5 the tensile stresses in the core are 48 MN/m$^2$. The composite glazing 1 has excellent characteristics both with respect to its mass manufacturability and with respect to its traffic and accident safety from the biochemical standpoint.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertically adjustable composite car glazing consisting of two thermally tempered single glazings of 1.5 mm to 3.5 mm thickness interconnected by a thermoplastic intermediate layer, each of said single glazings consisting of a central zone and a marginal area all around said central zone, said central zones and marginal areas of said glazings arranged opposite to one another when said glazings are interconnected, said glazings having a tempering which differs over the glazing surface such that the average tensile stress in the core of the central zone of the glazing is 5 to 35% lower than the average tensile stress in the core of the marginal area of the glazing, the tensile stress in the core of the marginal area of the glazing being 5 to 15% lower than the tensile stress in the core of a standard uniformly tempered glazing having the same thickness as the single glazing necessary to create from 40 to 400 glass crumbs upon destruction of a 5 cm×5 cm square portion thereof.

2. The composite glazing of claim 1 wherein each individual single glazing has a thickness of 2.0 to 3.0 mm.

3. The composite glazing of claim 1 wherein each single glazing has thickness of 2.0 to 3.0 mm and the tensile stresses in the core of the marginal area of a 2.0 mm glazing are between 54 to 76 $MN/m^2$ and decrease linearly with glazing thickness to 46.7–71.2 $MN/m^2$ for a glazing thickness of 3 mm; and wherein the central zone has tensile stresses in the core of 2 mm thick glazing of 38–64 $MN/m^2$ decreasing linearly with increasing glazing thickness to 33–60 $MN/m^2$ for a 3 mm thick glazing.

4. The composite glazing of claim 1 wherein tensile stresses in the core of the marginal area of a 2 mm thick glazing are 54–64 $MN/m^2$, decreasing linearly to 46.7–55 $MN/m^2$ for a 3 mm thick glazing; and in the central zone the tensile stresses in the core for a 2 mm thick glazing are 36–60 $MN/m^2$, decreasing linearly with increasing glazing thickness to 33–55 $MN/m^2$ for a glazing thickness of 3 mm.

5. The composite glazing of claim 1, wherein each of the single glazings has a thickness of 2.5 mm; in the marginal area a tensile stress in the core is 54 to 58 $MN/m^2$, and in the central zone the tensile stress is of 46 to 50 $MN/m^2$.

6. The composite glazing of claim 1, characterized in that the width of the more strongly tempered marginal area is 0.5 to 2 cm.

* * * * *